Oct. 21, 1930.  P. PAUTOU  1,779,286
INSULATING SEPARATOR FOR ACCUMULATOR PLATES
Filed Dec. 27, 1927

INVENTOR
Paul Pautou
BY
ATTORNEY

Patented Oct. 21, 1930

1,779,286

UNITED STATES PATENT OFFICE

PAUL PAUTOU, OF COLOMBES, FRANCE, ASSIGNOR TO THE FIRM: SOCIÉTÉ ANONYME DES ACCUMULATEURS MONOPLAQUE, OF COLOMBES, FRANCE

INSULATING SEPARATOR FOR ACCUMULATOR PLATES

Application filed December 27, 1927, Serial No. 242,811, and in France April 16, 1927.

This invention has for its object a process and corresponding means for the manufacture of insulating separators for accumulator plates and other uses.

Figure 1:
Figure 2:

It has already been proposed to encase the positive plates of accumulators in protecting envelopes designed to prevent the falling off of the active material but presenting a sufficient porosity to permit the electrolyte to come into contact with the plates. Certain means used for this purpose comprise perforated walls in which the perforations are obtained by the removal of material. In these means the separators are kept in intimate contact with the plates themselves so that the electrolyte cannot come into contact with the plates except through the perforations which increases the internal resistance in notable proportions. Certain means utilize separators in which slots are formed by means of incisions without removing material then by arranging the edges of these slots so as to form spaces of triangular section, two angles being utilized for the support of the accumulator plate while the third angle is occupied by the slot (Figure 1). The means of this nature utilized hitherto have not given the satisfactory results which it was reasonable to expect of them due to the fact that the distance apart of the edges was obtained by simple orientation thereof with the result that there was produced in the accumulator at the moment of elevations of temperature due to successive charges and discharges, a new modification in the shape of these edges as indicated in Figure 2 of the accompanying drawing, the edges tending to bear one against the other so as to restore the worked plate to its original form. Seeing that the slots or openings for the circulation of the electrolyte are obtained by incisions giving thus very sharp edges the flaps so formed rejoin producing a practically liquid tight seal as can be seen by reference to Figure 2 which prevents the electrolyte from coming into contact with the positive plate.

The process according to the present invention which remedies these disadvantages, consists in submitting the separators at the moment of their formation, to a rolling which determines the formation in these separators of depressions of triangular form for example obtained by elongation of the material which produces at the tops of these depressions splits designed to constitute circulation openings for the electrolyte for the purpose on the one hand of ensuring the permanent configuration of the separator whatever be the temperatures to which it may be subjected and on the other hand to prevent the edges of the openings thus formed from being able to close up in a hermetic manner.

Figure 3:
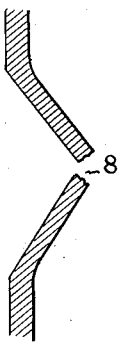
Figure 4:
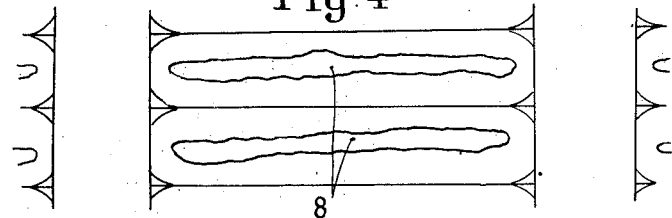
Figure 5:
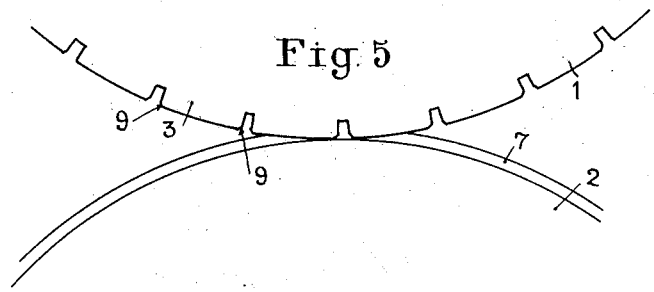
Figure 6:
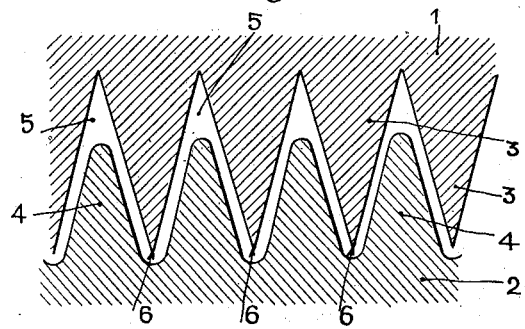

In the accompanying drawing which represents diagrammatically by way of example of carrying out the invention a constructional form of an arrangement for carrying out the process:

Figures 1 and 2 show in an indicative way a constructional form of a known arrangement in course of manufacture and after use respectively, Figure 3 is a similar view of a separator constructed according to this invention, Figure 4 is a diagrammatic plan view on a larger scale showing approximately the form of the openings formed in the separators according to this invention, Figure 5 is a fragmentary top plan view of the co-acting forming rollers embodied in the invention, and Figure 6 is a fragmentary vertical sectional view of the same and illustrating the relation of the forming teeth.

For the manufacture of separators according to the process according to the present invention, a machine is used having two rollers 1 and 2 (see Figure 5) turning in opposite directions and composed preferably of chilled steel, the roller 1 for example having teeth 3 which engage in the hollows formed between the teeth 4 on the second roller 2, as will be seen in Fig. 6, the teeth 3 on the roller 1 are sharp edged while the teeth 4 on the roller 2 have rounded teeth and hollows. The result is that each tooth 4 leaves in the hollow formed between the two teeth 3 a chamber or space 5 which permits of the free expansion of the material, while on the contrary in the space comprised between the top 6 of each tooth 3 and the hollow corresponding thereto which exists between two adjacent ones 4, there is no free space into which the material can expand.

The distance between the flanks of the adjacent teeth 3 and 4 may be conveniently less than the thickness of the sheets of material to be worked so as to ensure rolling of these sheets at the point where they pass between the rollers.

The roller 2 is provided with spaced circumferential smooth or interrupted portions 7 so as to leave parallel longitudinal smooth portions in the material being operated upon.

The action is as follows:

The sheet of plastic material, celluloid, ebonite, or other material which is to constitute the separator being placed between the rollers the teeth of which are separated by an interval less than the thickness of the said sheet, is subjected to a pass between the teeth 3 and 4, and is thereby rolled in such a way as to determine its elongation at the points operated on and by effecting a permanent deformation of the said sheet at these points. During the passage of this material beneath the tops of the teeth 4, it conforms thereto without breaking while on the contrary the part of the material which passes under the sharp tops 6 of the teeth 3 cracks and tears under the action of the rolling which it undergoes thereby forming slots whose walls are irregular. In use these irregular walls, as particularly shown in Figure 4 cannot rejoin to form a hermetical contact with each other.

The openings or slots 8 in the separator are designed to ensure the passage of the electrolyte so that the latter will contact with the accumulator plates as indicated above.

To permit of convenient rolling each of the teeth such as 3 (see Figure 5) has rounded ends 9 (see Figure 5) which allows of obtaining a notable reinforcement of the flaps of the rolled portions thus ensuring great strength to the separators so obtained and allowing them to maintain with efficacy the active material on the positive plates.

Due to this formation of the separating sheets it is possible to ensure the contact of the sheets with the accumulator plates on simple edges whatever be the temperature to which the accumulator may be subjected, which ensures that in all cases a satisfactory working is obtained with the internal resistance reduced to a minimum.

The sheets designed to constitute separators may be of any shape and of any desired dimensions and be composed of a transparent translucid or opaque material or may be plastic or not and preferably nonelastic. It will be preferred to use for the composition of these separators celluloid or ebonite but it must be understood that acetate or cellulose or any other suitable material may be used.

The invention applies to the manufacture of accumulator plates or any uses.

What I claim is:

1. As an article of manufacture, a battery plate separator consisting of a sheet having a multiplicity of slits therein whose walls are irregular to prevent the latter from coming together and sealing the slits.

2. As an article of manufacture, a separator sheet for battery plates having a corrugated surface, each of the corrugations being provided with a longitudinal slit, whose walls are irregular whereby such walls cannot come together to seal the slits.

3. As an article of manufacture, a separator for storage battery plates consisting of a sheet of non-conducting material having rows of laterally extending V-shaped members projecting from one face thereof, each of which has its apex formed with a longitudinal slit whose walls are irregular whereby such walls cannot come together to seal the slits.

In testimony whereof I have hereunto set my hand at Paris this 12th day of December, 1927.

PAUL PAUTOU.